United States Patent
Karasawa et al.

(10) Patent No.: US 12,261,910 B2
(45) Date of Patent: Mar. 25, 2025

(54) SENSOR DEVICE AND SENSOR SYSTEM

(71) Applicant: FUJI ELECTRIC CO., LTD., Kanagawa (JP)

(72) Inventors: Katsuya Karasawa, Shiojiri (JP); Kazuhiro Matsunami, Matsumoto (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 3 days.

(21) Appl. No.: 17/183,394

(22) Filed: Feb. 24, 2021

(65) Prior Publication Data

US 2021/0306422 A1 Sep. 30, 2021

(30) Foreign Application Priority Data

Mar. 24, 2020 (JP) ................................ 2020-053049

(51) Int. Cl.
*H04L 67/12* (2022.01)
*H04J 3/06* (2006.01)
*H04Q 9/00* (2006.01)

(52) U.S. Cl.
CPC ............ *H04L 67/12* (2013.01); *H04J 3/0638* (2013.01); *H04Q 9/00* (2013.01)

(58) Field of Classification Search
CPC ....... B60L 7/18; B60L 15/2009; G06K 19/07; H04W 4/80; H04L 67/12; G06F 1/16; H04J 3/0638
See application file for complete search history.

(56) References Cited

U.S. PATENT DOCUMENTS

| 10,129,339 B1 | 11/2018 | Boerrigter |
| 2012/0179424 A1† | 7/2012 | Bister |
| 2014/0352396 A1* | 12/2014 | Rauh .................. G01D 5/24461 73/1.01 |

(Continued)

FOREIGN PATENT DOCUMENTS

| JP | H02104198 A | 4/1990 |
| JP | H07177298 A | 7/1995 |

(Continued)

OTHER PUBLICATIONS

Office Action issued for counterpart Japanese Application No. 2020-053049, transmitted from the Japanese Patent Office on Oct. 3, 2023 (drafted on Sep. 28, 2023).

(Continued)

*Primary Examiner* — Iqbal Zaidi

(57) ABSTRACT

A sensor device is provided, including: a physical quantity sensor for detecting a physical quantity; and a processing circuit for generating and outputting a second signal including first data that are included in a first signal input from outside and second data that indicate a detection result of the physical quantity sensor. The first signal and the second signal have a plurality of messages, respectively; each message has two or more fast data slots and slow data slots; the first signal and the second signal are signals with predetermined data divided and stored in the slow data slots of two or more of the messages; and the processing circuit stores the first data and the second data in two of the fast data slots of the second signal.

16 Claims, 8 Drawing Sheets

(56) References Cited

U.S. PATENT DOCUMENTS

| | | | |
|---|---|---|---|
| 2015/0263762 A1* | 9/2015 | Shen .................. | H03M 13/353 |
| | | | 348/148 |
| 2020/0052874 A1 | 2/2020 | Itou | |
| 2021/0013981 A1* | 1/2021 | Ueda ...................... | G16H 40/67 |
| 2021/0306422 A1* | 9/2021 | Karasawa ............. | H04J 3/0638 |

FOREIGN PATENT DOCUMENTS

| | | |
|---|---|---|
| JP | 2014085990 A | 5/2014 |
| JP | 2019086417 A | 6/2019 |
| JP | 2020025227 A | 2/2020 |

OTHER PUBLICATIONS

SENT—Single Edge Nibble Transmission for Automotive Applications J2716_201604 https://www.sae.org/standards/content/j2716_201604/.†

\* cited by examiner
† cited by third party

SENSOR DEVICE AND SENSOR SYSTEM

The contents of the following Japanese patent application are incorporated herein by reference:
NO. 2020-053049 filed in JP on Mar. 24, 2020.

BACKGROUND

1. Technical Field

The present invention relates to a sensor device and a sensor system.

2. Related Art

Conventionally, a pressure sensor for outputting signals to an external processing device by a SENT (registered trademark) protocol and so on is known (for example, refer to Patent Document 1 and 2).
Patent Document 1: Japanese Patent Application Publication No. 2019-86417
Patent Document 2: U.S. patent Ser. No. 10/129,339 specification When the number of pressure sensors is increased, the number of harnesses for connecting the respective pressure sensors to processing devices is also increased.

SUMMARY

To solve the above-described problem, a first aspect of the present invention provides a sensor device including a physical quantity sensor for detecting a physical quantity. The sensor device may include a processing circuit for generating and outputting a second signal including first data that are included in a first signal input from outside, and second data that indicate a detection result of the physical quantity sensor.

The processing circuit may generate the second signal of the protocol identical to that of the first signal.

The processing circuit may have a decoder for extracting the first data from the first signal.

The first signal and the second signal may respectively have a plurality of data slots for storing data. The processing circuit may store the first data extracted from the data slots of the first signal and the second data in different data slots of the second signal.

The physical quantity sensor may be a pressure sensor.

The processing circuit may receive a clock signal synchronized with the first signal, and process the first signal based on the clock signal.

The first signal and the second signal may have a plurality of messages, respectively. Each message may have two or more fast data slots and slow data slots. The first signal and the second signal may be signals respectively with predetermined data divided and stored in the slow data slots of two or more of the messages. The processing circuit may store the first data and the second data in two of the fast data slots of the second signal.

The first data and the second data may be data indicating pressure values. The processing circuit may store data indicating temperature in the slow data slots.

The processing circuit may not extract the data stored in the slow data slots of the first signal, but may extract the data from the fast data slots preset as the slots for storing the first data of the fast data slots of the first signal.

The first signal and the second signal may be signals that comply with a SENT protocol.

A second aspect of the present invention provides a sensor device including a physical quantity sensor for detecting a physical quantity. The sensor device may include a processing circuit including a first generation function for generating a second signal including first data included in a first signal input from outside and the second data indicating a detection result of the physical quantity sensor, and a second generation function for generating a third signal including the second data indicating a detection result of the physical quantity sensor.

The processing circuit may generate the second signal that complies with the protocol identical to the first signal.

The processing circuit may have a decoder for extracting the first data from the first signal.

The processing circuit may select any of the first generation function and the second generation function by inputting setting information.

The sensor device may include a memory. The setting information may be stored in the memory.

The first to the third signals may be signals that comply with a SENT protocol.

The physical quantity sensor may be a pressure sensor.

A third aspect of the present invention provides a sensor system including a first sensor device and a second sensor device. The first sensor device may have a first physical quantity sensor for detecting a physical quantity. The first sensor device may have a first processing circuit for generating and outputting a first signal including first data indicating a detection result of the first physical quantity sensor. The second sensor device may have a second physical quantity sensor for detecting a physical quantity. The second sensor device may have a second processing circuit for receiving the first signal, generating and outputting a second signal including the first data that are included in the first signal and the second data indicating a detection result of the second physical quantity sensor.

The first sensor device and the second sensor device may be implemented in different circuit boards from each other.

The first processing circuit and the second processing circuit may generate the first signal and the second signal of an identical protocol.

The second processing circuit may have a decoder for extracting the first data from the first signal.

A plurality of pairs of the first sensor device and the second sensor device may be included.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the invention according to the claims. In addition, not all combinations of the features described in the embodiments are necessarily indispensable to the solution of the invention.

Figure 1:
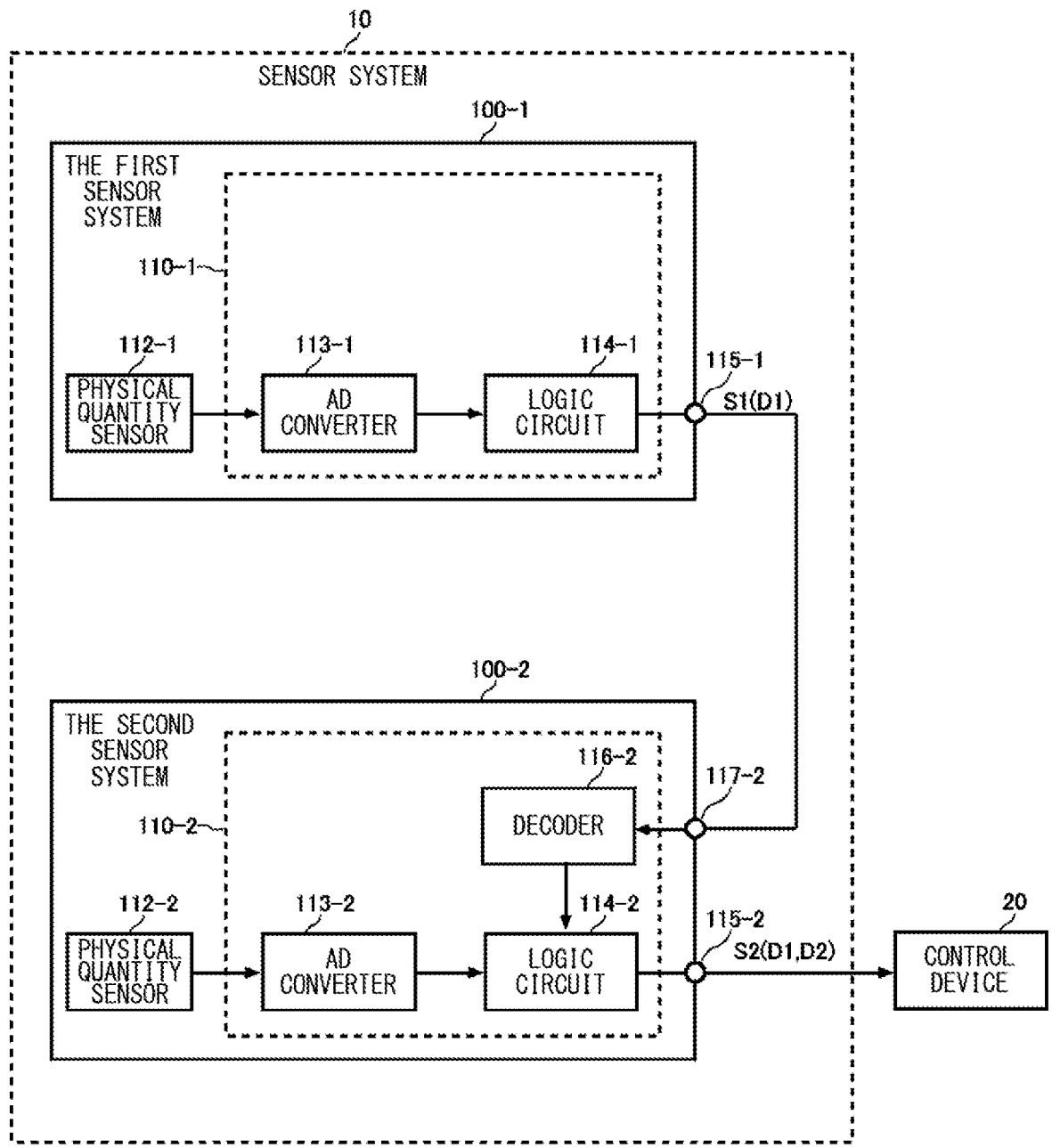
FIG. 1 illustrates a configuration example of a sensor system 10 according to one embodiment of the present invention.

FIG. 1 illustrates a configuration example of a sensor system 10 according to one embodiment of the present invention. The sensor system 10 detects a physical quantity such as pressure or temperature in the ambient environment, and outputs a signal indicating a detection result to a control device 20. The sensor system 10 may include a harness for transmitting the signal to the control device 20. The harness is, for example, a wire, or may be a wiring other than a wire.

The control device 20 processes the signal received from the sensor system 10. The control device 20 may control another device based on the processing result of the signal. The control device 20 is an engine control device (ECU) for controlling a vehicle engine, and the sensor system 10 is a pressure sensor for detecting pressure of any region of the engine as one example. The control device 20 may control the vehicle engine based on the signal from the sensor system 10.

The sensor system 10 includes a plurality of sensor devices 100 for detecting physical quantities. The physical quantity is, for example, pressure, temperature, moisture or the like of the ambient environment, but it is not limited thereto. One sensor device 100 may detect one type of physical quantity or may detect a plurality of types of physical quantity. In the example of FIG. 1, the sensor system 10 includes a first sensor device 100-1 and a second sensor device 100-2. The respective sensor devices 100 may be devices implemented in circuit boards different from each other. The circuit board in this specification may be a semiconductor substrate, a printed substrate, a flexible substrate or the like.

Each sensor device 100 has a physical quantity sensor 112, a processing circuit 110, a terminal 115 and a terminal 117. In the identical sensor device 100, the physical quantity sensor 112 and the processing circuit 110 may be implemented on the identical circuit board.

The physical quantity sensor 112 detects a physical quantity such as pressure and temperature. The physical quantity sensor 112 may output an electrical signal according to the detected physical quantity. For example, the physical quantity sensor 112 is a pressure sensor. The physical quantity sensor 112 may have a detection unit where the electrical resistance value changes according to the detected pressure value, and output an analog electrical signal according to the electrical resistance value.

The processing circuit 110 generates a signal including the detection result of the physical quantity sensor 112. The processing circuit 110 may have an AD converter 113 for converting the analog signal from the physical quantity sensor 112 to a digital signal, and a logic circuit 114 for processing the digital signal. In this example, the signal output by the processing circuit 110-1 of the first sensor device 100-1 is referred to as a first signal S1, and the signal output by the processing circuit 110-2 of the second sensor device 100-2 is referred to as a second signal S2. Further, the first signal S1 includes first data D1 indicating the detection result of the physical quantity sensor 112-1 of the first sensor device 100-1, and the second signal S2 includes second data D2 indicating the detection result of the physical quantity sensor 112-2 of the second sensor device 100-2 and the first data D1.

In this example, the logic circuit 114-1 of the first sensor device 100-1 outputs the first signal S1 to the second sensor device 100-2. The second sensor device 100-2 extracts the first data D1 included in the input first signal S1. The processing circuit 110-2 may have a decoder 116-2 for extracting the first data D1 from the first signal S1. In the decoder 116-2, information indicating which bit of the first signal S1 corresponds to the first data D1 may be preset.

The logic circuit 114-2 of the processing circuit 110-2 generates and outputs the second signal S2 that includes the first data D1 extracted by the decoder 116-2 and the second data D2 indicating the detection result of the physical quantity sensor 112-2 to the control device 20. The control device 20 extracts the first data D1 and the second data D2 by decoding the second signal S2. According to such a configuration, the number of the harnesses connected to the control device 20 can be reduced. Particularly, when a plurality of sensor systems 10 are connected to the control device 20, if each sensor device 100 is connected to the control device 20, the number of the harnesses will become large. In contrast, according to this example, one sensor system 10 is connected to the control device 20 by one harness. Therefore, the number of the harnesses connected to the control device 20 where the harnesses tend to concentrate can be reduced.

In this example, the first signal S1 and the second signal S2 are digital signals. The processing circuit 110-2 may generate the second signal S2 that complies with the protocol identical to that of the first signal S1. As one example, the protocol is a SENT protocol.

Each of the first signal S1 and the second signal S2 may have a plurality of data slots for storing data. The slot may be a group of bits in a signal. For example, a predetermined range of bits of the first signal S1 and the second signal S2 are assigned to the data slot. The decoder 116-2 extracts the first data D1 from the data slots of the first signal S1. The logic circuit 114-2 may store the first data D1 extracted by the decoder 116-2 and the second data D2 in different data slots of the second signal S2.

Figure 2:
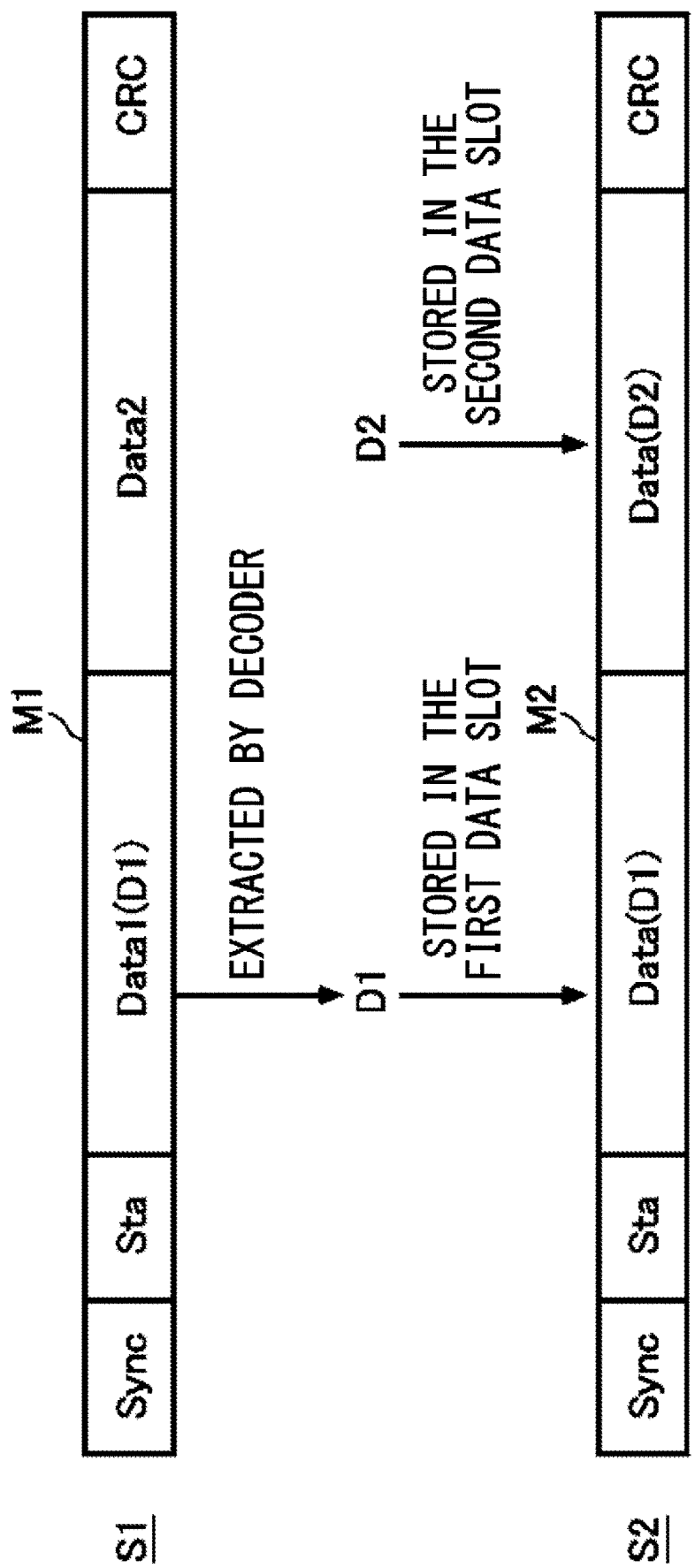
FIG. 2 illustrates one example of a data format of a first signal S1 and a second signal S2.

FIG. 2 illustrates one example of a data format of the first signal S1 and the second signal S2. The data format is information indicating a role assigned to each slot of the signal.

In this example, the first signal S1 includes one or more messages M1, and the second signal S2 includes one or more messages M2. Each message M has a synchronous slot Sync, a state slot Sta, a first data slot Data1, a second data slot Data2, and an error correction slot CRC.

The synchronous slot Sync is a slot indicating the boundary between the message and another message. The synchronous slot Sync of this example is arranged in the beginning of the message M and stores a predetermined data value. The state slot Sta stores the data indicating the state of any device of the sensor system 10, or the state of a signal S. The state slot Sta may store error data when an abnormality are detected in any device of the sensor system 10, may store data indicating the type of the physical quantity of the data stored in the data slot Data or the type of the physical quantity sensor 112 and so on, or may store data indicating a coefficient by which the data value is to be multiplied to calculate the upper limit value, the lower limit value, the physical quantity or the like of the data stored in the data slot Data. The state slot Sta may also store data indicating the version of the protocol of the signal S.

The first data slot Data1 and the second data slot Data2 store the data according to the physical quantity detected by the physical quantity sensor 112. The error correction slot CRC stores data such as CRC codes for correcting data errors in the message.

The logic circuit 114-1 of this example stores the first data D1 in any data slot of the first signal S1 (the first data slot Data1 in the example of FIG. 2). The decoder 116-2 extracts the first data D1 from the first signal S1. The logic circuit 114-2 stores the first data D1 in any data slot of the second signal S2 (the first data slot Data1 in the example of FIG. 2), and stores the second data D2 in another data slot (the second data slot Data2 in the example of FIG. 2).

In this way, the second signal S2 including the first data D1 and the second data D2 can be generated. The processing circuit 110-1 and the processing circuit 110-2 may be circuits for processing the signals according to the identical protocol (for example, a SENT protocol).

Figure 3:
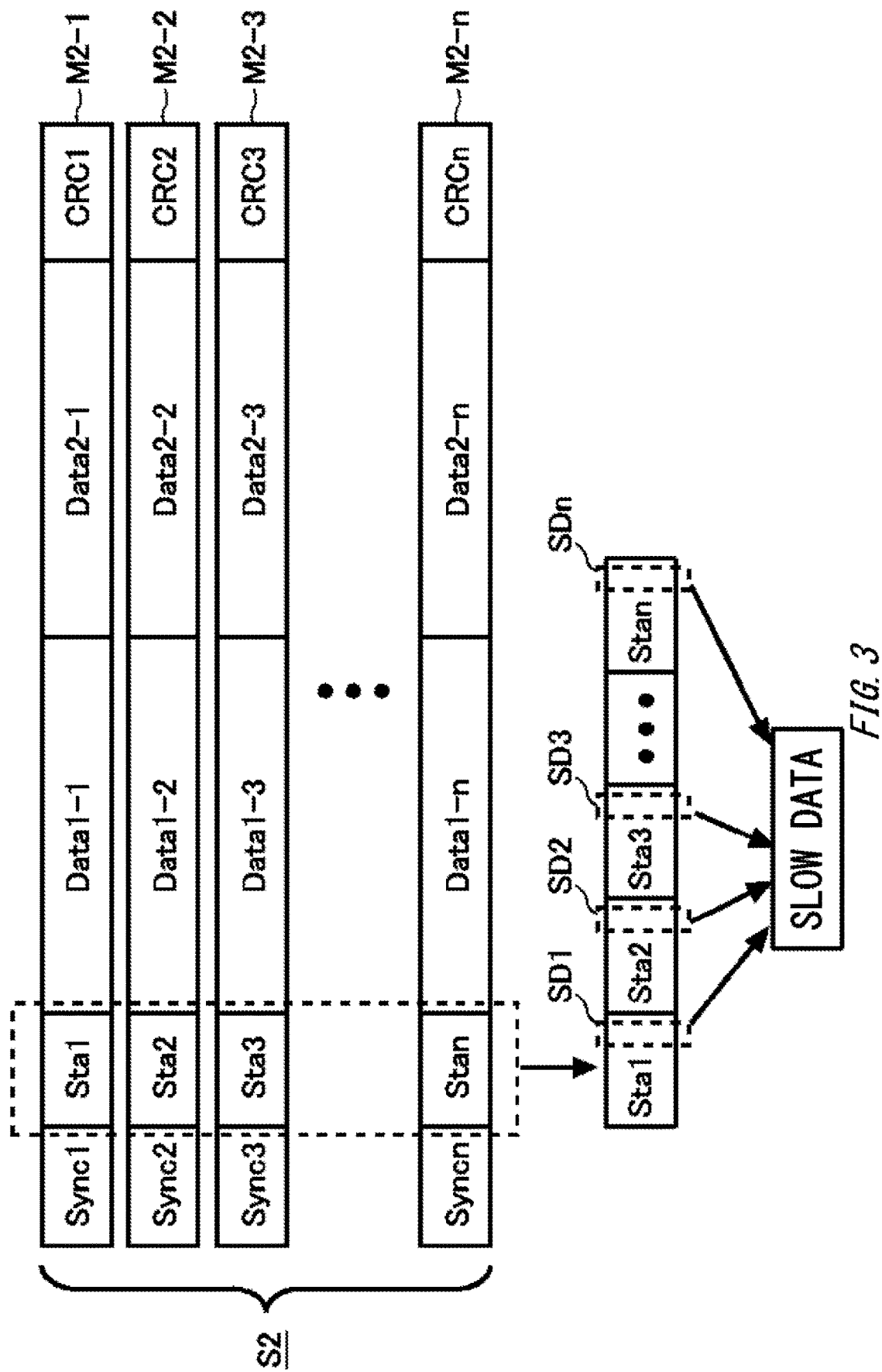
FIG. 3 illustrates one example of the data format of the second signal S2.

FIG. 3 illustrates one example of a data format of the second signal S2. In this example, although the data format of the second signal S2 is described, the first signal S1 also has a data format identical to that of the second signal S2. The second signal S2 of this example includes n messages M2-1 to M2-$n$ (where n is an integer number equal to or greater than 2).

Each of the n messages has two or more fast data slots and slow data slots. In this example, the first data slot Data1 and the second data slot Data2 correspond to two fast data slots. Also, some bits of the state slot Sta correspond to the slow data slot SD. In FIG. 3, the state slots Sta1 to Sta$n$ of the respective messages are shown side by side. As indicated by the dashed lines, the respective state slots Sta1 to Sta$n$ include the slow data slots SD1 to SD$n$.

The second signal S2 is a signal where the predetermined data are divided and stored in the slow data slots of two or more messages M. In this example, the predetermined data are divided and stored in each of the slow data slots SD1 to SD$n$ of the n messages M2-1 to M2-$n$. The control device 20 may detect slow data by combining each bit of the n slow data slots SD1 to SD$n$ included in the second signal S2. That is, one fast data is detected from one message, and one slow data is detected from a plurality of messages. Therefore, the slow data has a slower transmission speed of the data than that of the fast data.

The processing circuit 110-1 of this example stores the first data D1 in the fast data slots of the first signal S1. Also, the processing circuit 110-2 stores the first data D1 and the second data D2 in the fast data slots of the second signal S2. The first data D1 and the second data D2 may be the data indicating pressure values.

The processing circuit 110-2 may store data indicating a physical quantity of a different type from the first data D1 and the second data D2 in the slow data slots of the second signal S2. For example, the processing circuit 110-2 stores data indicating temperature in the slow data slots. The temperature may be the temperature detected by the first sensor device 100-1 or may be the temperature detected by the second sensor device 100-2. In this case, at least one of the first sensor device 100-1 and the second sensor device 100-2 has a temperature sensor.

According to such a configuration, the data whose detection period is desired to be shortened and the data whose detection period may be relatively long can be transmitted by an identical signal. For example, in the case where the engine is desired to be controlled to follow the pressure fluctuations at a high speed, but may follow the temperature fluctuations at a relatively low speed, the configuration of this example is effective.

As one example, the processing circuit 110-2 of the second sensor device 100-2 may store the data of the physical quantity such as temperature in the slow data slots of the second signal S2. In this case, the decoder 116-2 may not extract the slow data of the first signal S1. Therefore, the circuit scale of the decoder 116-2 can be reduced. The processing circuit 110-1 of the first sensor device 100-1 may or may not store the data in the slow data slots of the first signal S1. In any case, the decoder 116-2 may not extract the slow data of the first signal S1.

Also, the decoder 116-2 may extract the data of the data slots preset as the slots for storing the first data D1 among the plurality of fast data slots. The circuit scale of the decoder 116-2 can be reduced by not extracting data of the other data slots.

The processing circuit 110-1 may also store error data of a predetermined bit value instead of the first data D1 in the fast data slots when an abnormality is generated in the first sensor device 100-1. In this way, the error data can be extracted by the decoder 116-2 with a small circuit scale. The processing circuit 110-1 may also store the error data in the state slot Sta. In this case, the decoder 116-2 also preferably extracts data of the state slot Sta. The processing circuit 110-2 may store the error data in the state slot Sta of the second signal S2 when an abnormality is generated in any of the first sensor device 100-1 and the second sensor device 100-2.

Figure 4:
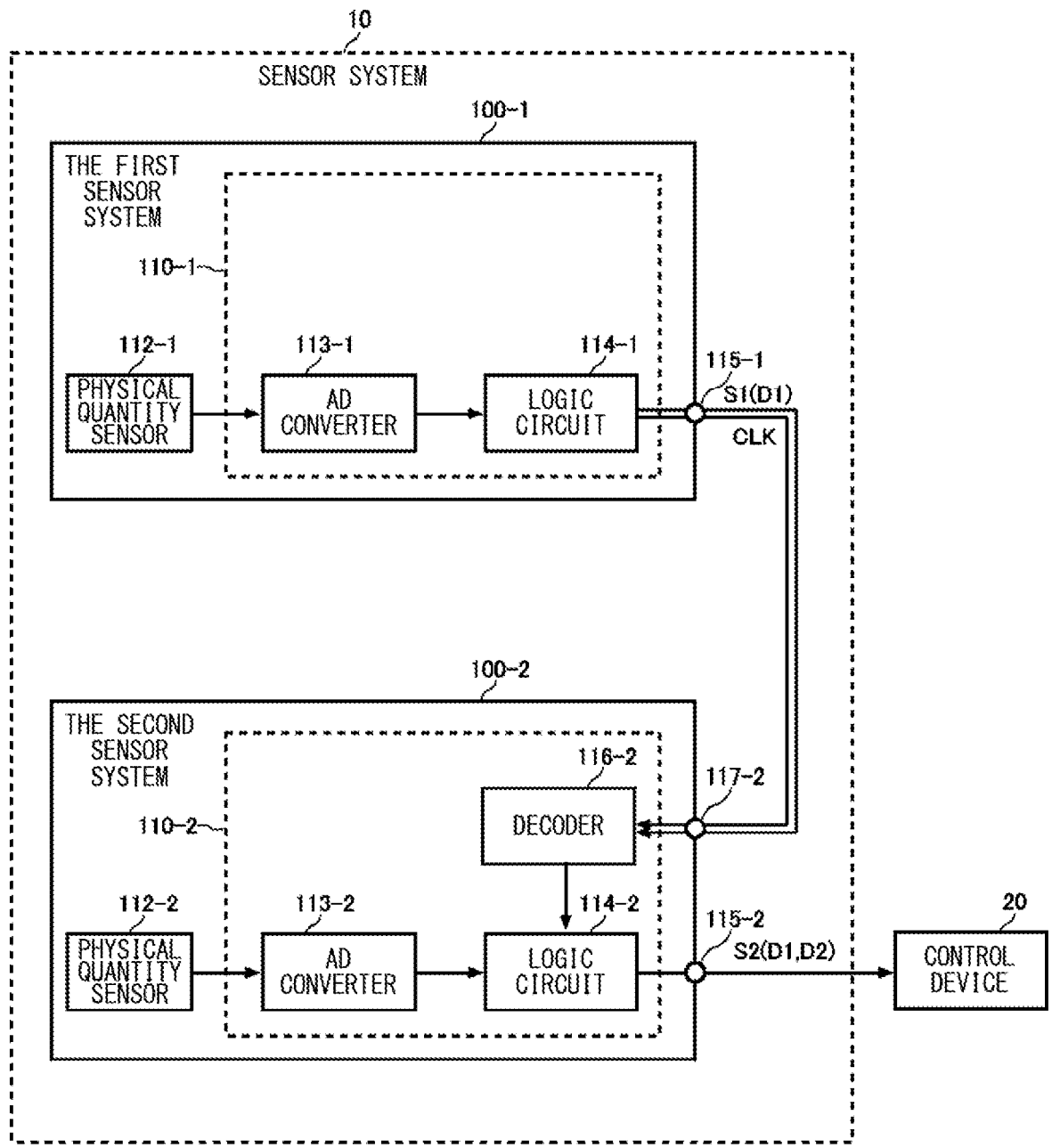
FIG. 4 illustrates another configuration example of the sensor system 10.

FIG. 4 illustrates another configuration example of the sensor system 10. The sensor system 10 of this example is different from the example described in FIG. 1 to FIG. 3 in that the logic circuit 114-1 of the first sensor device 100-1 outputs the first signal S1 together with a clock signal CLK synchronized with the first signal S1. The sensor system 10 has the same configuration as that of the example described in FIG. 1 to FIG. 3 other than the configuration related to the clock signal CLK.

The decoder 116-2 of the second sensor device 100-2 receives the first signal S1 and the clock signal CLK. The decoder 116-2 extracts the value of each bit in the first signal S1 by sampling the first signal S1 according to the clock signal. According to such a configuration, the value of the first signal S1 can be detected with high precision.

The second sensor device 100-2 may output the clock signal synchronized with the second signal S2 together with the second signal S2 to the control device 20. The period of the second signal S2 may be identical to or may be different from that of the first signal S1.

Figure 5A:
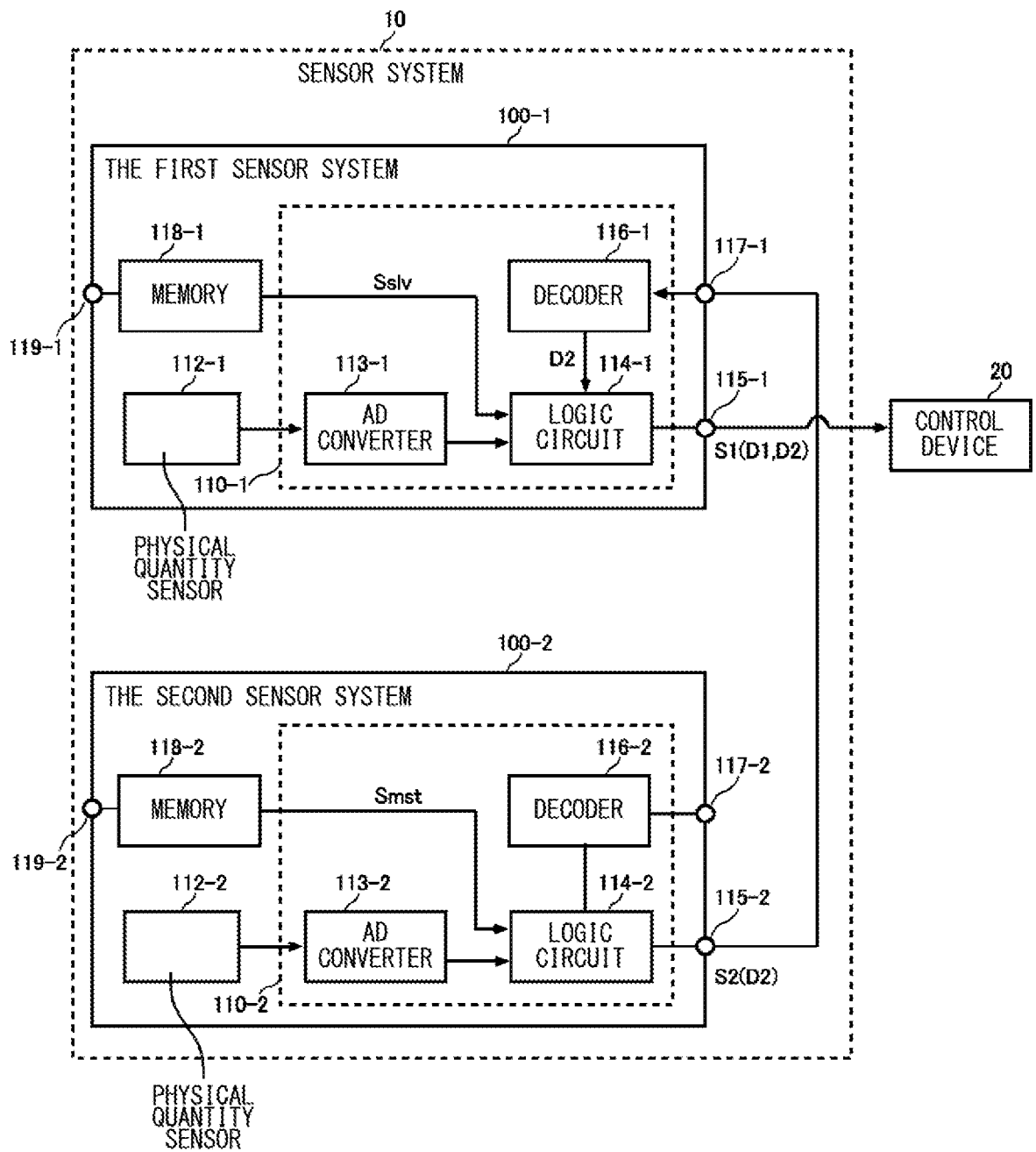
FIG. 5A illustrates another configuration example of the sensor system 10.

FIG. 5A illustrates another configuration example of the sensor system 10. The sensor system 10 of this example is different from the respective examples described in FIG. 1 to FIG. 4 in that the first sensor device 100-1 has a decoder 116-1 and a terminal 117-1, and each of the sensor devices 100 has a memory 118 and a terminal 119. That is, the first sensor device 100-1 has a configuration identical to that of the second sensor device 100-2. The other configurations are the same as any example described in the FIG. 1 to FIG. 4.

In this example, one device of the sensor devices 100 for outputting the signal S to another sensor device 100 is referred to as a master side device, and the other device of the sensor devices 100 for outputting the signal to the control device 20 is referred to as a slave side device. In the example of FIG. 1 to FIG. 4, the first sensor device 100-1 is the master side device, and the second sensor device 100-2 is the slave side device. According to the configuration shown in FIG. 5A, any sensor device 100 can function as the master side device, and also can function as the slave side device. In the example of FIG. 5A, the first sensor device 100-1 is the slave side device, and the second sensor device 100-2 is the master side device. The memory 118 of each of the sensor devices 100 stores setting information indicating whether the device is the master side or the slave side, and the logic circuit 114 of each of the sensor devices 100 may read the setting information Smst indicating that the corresponding sensor device 100 is the master side, or the setting information Sslv indicating that the corresponding sensor device 100 is the slave side from the memory 118. The terminal 119 may store the setting information indicating whether each of the sensor devices 100 is the master side or the slave side in the memory 118 from outside. Also, the setting information indicating whether each of the sensor devices 100 is the master side or the slave side may also be input to the logic circuit 114 directly from outside instead of being stored in the memory 118. The harness for connecting each device is provided corresponding to the setting information. The sensor system 10 may also include a switching unit for switching the output terminal of which sensor device 100 to connect to the harness of the control device 20 according to the setting information. Also in this case, since the master side device and the slave side device have an identical physical shape and internal structure, the colors and shapes of their exteriors may also be different to distinguish between the two. Also, when the master side device and the slave side device are connected in reverse, each of the sensor devices 100 or the control device 20 may also output an error signal.

The logic circuit 114 set as the master side stores the data from the corresponding physical quantity sensor 112 in the signal S. The logic circuit 114 set as the slave side stores the data from the corresponding decoder 116 and the data from the corresponding physical quantity sensor 112 in the signal S. According to such a configuration, each of the sensor devices 100 can function as a device of any of the master side and the slave side.

Figure 5B:
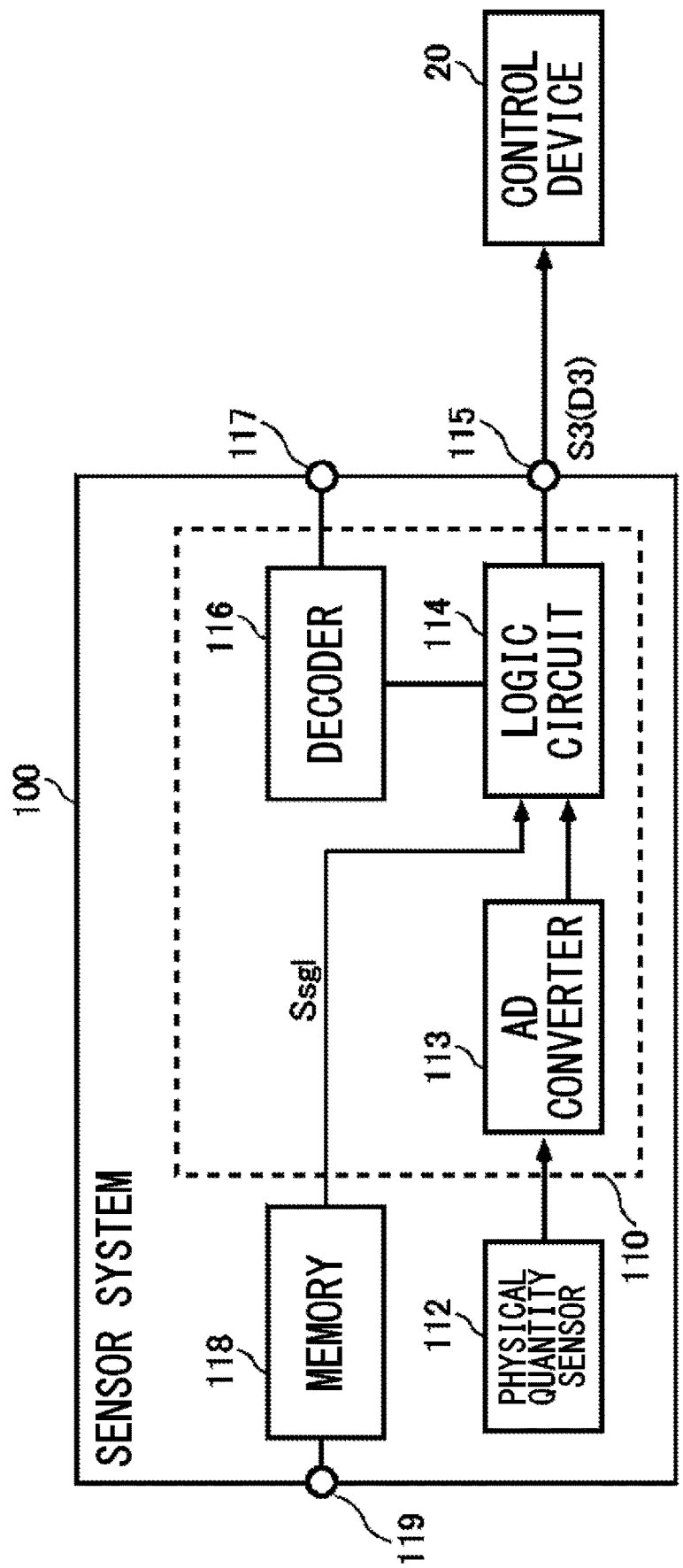
FIG. 5B illustrates another configuration example of the sensor system 10.

FIG. 5B has only one of the sensor devices 100 used in the example of FIG. 5A. In this case, the sensor device 100 outputs a third signal S3. The sensor device 100 of this example includes a memory 118, as is the case with the second sensor device 100-2 shown in FIG. 5A. In the memory 118, the setting information indicating that the sensor device 100 is used alone may be stored. The logic circuit 114 may read the setting information Ssgl indicating that the sensor device 100 is used alone from the memory 118. The terminal 119 may store the setting information indicating that the device is used alone in the memory 118 from outside. The logic circuit 114 generates the third signal S3 based on the data from the physical quantity sensor 112.

The data for calibrating the output of the physical quantity sensor may be stored in the memory 118 described in the FIG. 5A and FIG. 5B. Also, the memory 118 can use a rewritable non-volatile memory such as a flash memory.

As described above, the sensor device 100 that can function as the master side or the slave side can also be used alone. Therefore, the sensor device 100 can be selectable to be the master side, the slave side or alone. Therefore, the logic circuit 114 includes a first generation function as a function when used as the slave side, for generating the second signal that includes the first data from the first signal input from outside and the second data indicating the detection result of the physical quantity sensor. Furthermore, the logic circuit 114 includes a second generation function as a function when used as the master side or alone, for generating the third signal that includes the second data indicating the detection result of the physical quantity sensor. Moreover, the three usage aspects can be switched by the setting information stored in the memory 118. It is noted that the setting information in the case of functioning as the master side may also be the same as that of the case of being used alone.

Figure 6:
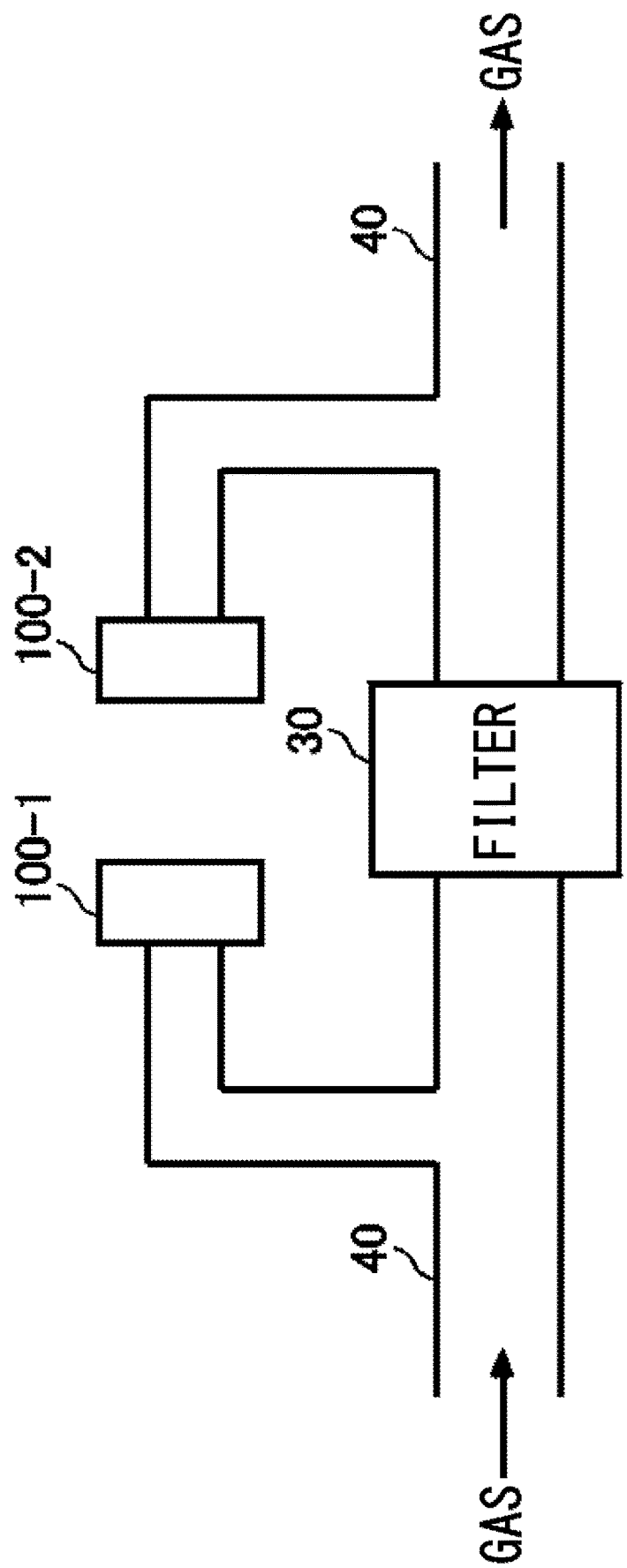
FIG. 6 illustrates an exemplary arrangement of a first sensor device 100-1 and a second sensor device 100-2.

FIG. 6 illustrates an exemplary arrangement of the first sensor device 100-1 and the second sensor device 100-2. The first sensor device 100-1 and the second sensor device 100-2 of this example detect the gas pressure inside a gas pipe 40 for the intake gas or the exhaust gas of the vehicle engine to pass. In the gas pipe 40, a filter 30 is provided to remove foreign substances and so on included in the gas passing through the gas pipe 40. The first sensor device 100-1 detects the gas pressure inside the gas pipe 40 of the upstream side of the filter 30. The second sensor device 100-2 detects the gas pressure inside the gas pipe 40 of the downstream side of the filter 30. The upstream and the downstream refer to the positions along the flowing direction of gas. Clogging of the filter 30 and so on can be detected by detecting the gas pressure of the two positions sandwiching the filter 30. Also, the distance between the sensor devices can be shortened and the length of the harness can be shortened, by combining the two sensor devices near the filter 30 as the first sensor device 100-1 and the second sensor device 100-2. Also, the related two pressure values can be included in one signal and transmitted to the control device 20.

Figure 7:
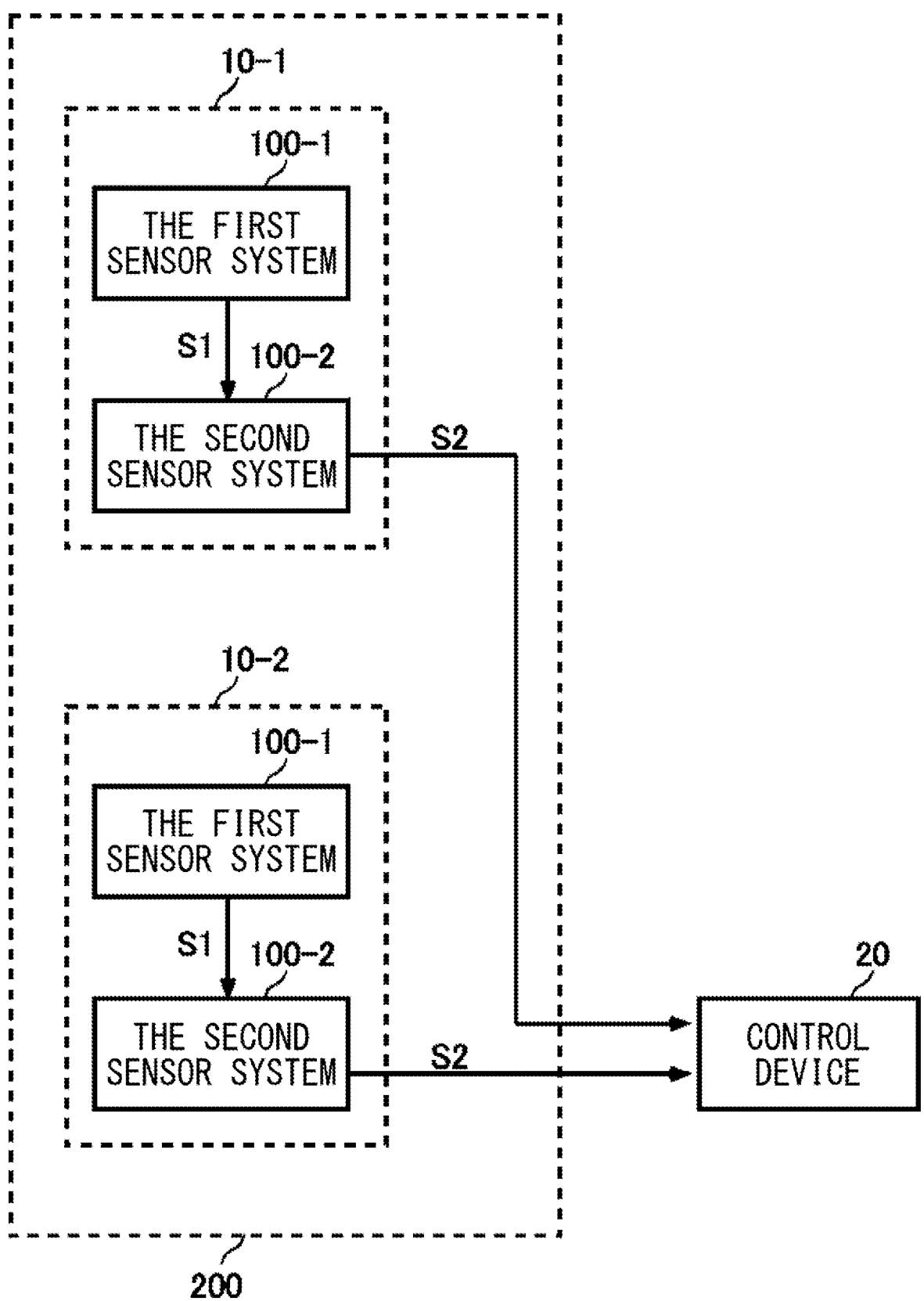
FIG. 7 illustrates one example of a sensor system 200.

FIG. 7 illustrates one example of the sensor system 200. The sensor system 200 of this example includes a plurality of sensor systems 10 described in FIG. 1 to FIG. 6. That is, the sensor system 200 includes a plurality of pairs of the first sensor device 100-1 and the second sensor device 100-2. Normally, the greater the number of sensor devices 100, the more harnesses are concentrated in the control device 20. According to this example, since the sensor system 10 including two sensor devices 100 is connected to the control device 20 by one harness, the number of the harnesses connected to the control device 20 can be halved.

While the embodiments of the present invention have been described, the technical scope of the invention is not limited to the above described embodiments. It is apparent to persons skilled in the art that various alterations or improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:
1. A sensor device comprising:
 a physical quantity sensor for detecting a physical quantity; and
 a processing circuit for generating and outputting a second signal, wherein the second signal includes first data and second data,
wherein the first data was included in a first signal input from outside the sensor device,
wherein the second data indicates a detection result of the physical quantity sensor, and
wherein the processing circuit generates the second signal that complies with a protocol identical to that of the first signal, and
wherein the processing circuit receives a clock signal synchronized with the first signal, and processes the first signal based on the clock signal.

2. The sensor device according to claim 1, wherein:
the processing circuit has a decoder for extracting the first data from the first signal.

3. A sensor device comprising:
a physical quantity sensor for detecting a physical quantity; and
a processing circuit for generating and outputting a second signal,
wherein the second signal includes first data and second data,
wherein the first data was included in a first signal input from outside the sensor device,
wherein the second data indicates a detection result of the physical quantity sensor,
wherein the processing circuit generates the second signal that complies with a protocol identical to that of the first signal,
wherein the processing circuit has a decoder for extracting the first data from the first signal,
wherein the first signal and the second signal respectively have a plurality of data slots for storing data, and
wherein the processing circuit stores the first data extracted from the data slots of the first signal and the second data in different data slots of the second signal.

4. A sensor device comprising:
a physical quantity sensor for detecting a physical quantity; and
a processing circuit for generating and outputting a second signal,
wherein the second signal includes first data and second data,
wherein the first data was included in a first signal input from outside the sensor device,
wherein the second data indicates a detection result of the physical quantity sensor,
wherein the processing circuit generates the second signal that complies with a protocol identical to that of the first signal,
the first signal and the second signal have a plurality of messages, respectively, each message has two or more fast data slots and slow data slots
the first signal and the second signal are signals with predetermined data divided and stored in the slow data slots of two or more of the messages, and
the processing circuit stores the first data and the second data in two of the fast data slots of the second signal.

5. The sensor device according to claim 4, wherein:
the first data and the second data are data indicating pressure values; and
the processing circuit stores data indicating temperature in the slow data slots.

6. The sensor device according to claim 4, wherein the processing circuit:
does not extract data stored in the slow data slots of the first signal, but extracts the data from the fast data slots preset as the slots for storing the first data of the fast data slots of the first signal.

7. The sensor device according to claim 4, wherein:
the first signal and the second signal are signals that comply with a SENT protocol.

8. A sensor device comprising:
a physical quantity sensor for detecting a physical quantity; and
a processing circuit including a first generation function and a second generation function,
wherein the first generation function is for generating a second signal,
wherein the second signal includes first data and second data,
wherein the first data was included in a first signal input from outside the sensor device,
wherein the second data indicating a detection result of the physical quantity sensor,
wherein the second generation function is for generating a third signal including the second data indicating the detection result of the physical quantity sensor,
wherein the processing circuit generates the second signal that complies with a protocol identical to the first signal, and
wherein the first to the third signals are signals that comply with a SENT protocol.

9. The sensor device according to claim 8, wherein:
the processing circuit has a decoder for extracting the first data from the first signal.

10. The sensor device according to claim 8, wherein:
the processing circuit selects any of the first generation function and the second generation function by inputting setting information.

11. The sensor device according to claim 10, further comprising:
a memory; wherein
the setting information is stored in the memory.

12. The sensor device according to claim 1, wherein:
the physical quantity sensor is a pressure sensor.

13. A sensor system comprising a first sensor device and a second sensor device, wherein:
the first sensor device has:
   a first physical quantity sensor for detecting a physical quantity, and
   a first processing circuit for generating and outputting a first signal including first data indicating a detection result of the first physical quantity sensor; and
the second sensor device has:
   a second physical quantity sensor for detecting a physical quantity, and
   a second processing circuit for receiving the first signal, and generating and outputting a second signal including the first data and second data, wherein the first data was included in the first signal and wherein the second data indicates a detection result of the second physical quantity sensor; and
the first processing circuit and the second processing circuit generate the first signal and the second signal that comply with an identical protocol, and
the first processing circuit and the second processing circuit receives a clock signal synchronized with the first signal, and processes the first signal based on the clock signal.

14. The sensor system according to claim 13, wherein:
the first sensor device is comprised in a first circuit board and the second sensor device is comprised in a second circuit board, wherein the first circuit board is different from the second circuit board.

15. The sensor system according to claim 13, wherein: the second processing circuit has a decoder for extracting the first data from the first signal.

16. The sensor system according to claim 13, comprising: a plurality of pairs of the first sensor device and the second sensor device.

\* \* \* \* \*